(12) United States Patent
Chang et al.

(10) Patent No.: US 10,459,928 B2
(45) Date of Patent: Oct. 29, 2019

(54) DYNAMIC TENSOR ATTENTION FOR INFORMATION RETRIEVAL SCORING

(71) Applicant: Microsoft Technology Licensing, LLC, Redmond, WA (US)

(72) Inventors: Keng-hao Chang, San Jose, CA (US); Ruofei Zhang, Mountain View, CA (US); Zi Yin, Jiangsu (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 282 days.

(21) Appl. No.: 15/379,262

(22) Filed: Dec. 14, 2016

(65) Prior Publication Data
US 2018/0165288 A1    Jun. 14, 2018

(51) Int. Cl.
| | | |
|---|---|---|
| *G06F 16/00* | (2019.01) | |
| *G06F 16/2457* | (2019.01) | |
| *G06F 16/93* | (2019.01) | |
| *G06N 3/04* | (2006.01) | |
| *G06F 16/33* | (2019.01) | |
| *G06F 16/332* | (2019.01) | |

(52) U.S. Cl.
CPC .... *G06F 16/24578* (2019.01); *G06F 16/3325* (2019.01); *G06F 16/3346* (2019.01); *G06F 16/93* (2019.01); *G06N 3/0445* (2013.01); *G06N 3/0454* (2013.01)

(58) Field of Classification Search
CPC .. G06N 3/0472; G06N 3/0445; G06N 3/0454; G06F 16/24578; G06F 16/93; G06F 16/3346; G06F 16/3325
See application file for complete search history.

(56) References Cited

U.S. PATENT DOCUMENTS 6,687,689 B1    2/2004   Fung et al.
2002/0174101 A1*   11/2002   Fernley ............ G06F 17/30663
(Continued)

OTHER PUBLICATIONS

Yin, et al. "Neural Generative Question Answering", In Proceedings of the Twenty-Fifth International Joint Conference on Artificial Intelligence, Jul. 9, 2016, pp. 1-12.
(Continued)

*Primary Examiner* — Robert W Beausoliel, Jr.
*Assistant Examiner* — Hau Hoang
(74) *Attorney, Agent, or Firm* — Merchant & Gould

(57) ABSTRACT

A technique of scoring a query against a document using sequence to sequence neural networks. The technique comprises: receiving a query comprising a plurality of words from a user; performing a search for a document comprising words based on the query; feeding the words of the document as the input of an encoder of a multilayer sequence to sequence converter; generating a plurality of vectors at a decoder of the multilayer sequence to sequence converter, each vector comprising a probability associated with a respective word in the query; looking up in the respective vector each word's probability of being associated with the document; multiplying every word's probability together to determine an overall probability of the query being associated with the document; and returning the document to the user if the overall probability of the query being associated with the document is greater than a threshold value.

20 Claims, 9 Drawing Sheets

(56) References Cited

U.S. PATENT DOCUMENTS

| | | | |
|---|---|---|---|
| 2003/0004927 A1* | 1/2003 | Zhai | G06F 17/30675 |
| 2006/0004891 A1 | 1/2006 | Hurst-hiller et al. | |
| 2016/0358094 A1* | 12/2016 | Fan | G06F 17/3053 |

OTHER PUBLICATIONS

Cho, Kyunghyun "Natural Language Understanding with Distributed Representation", In Journal of the Computing Research Repository, Nov. 26, 2015, pp. 1-123.

Meng, et al., "A Deep Memory-Based Architecture for Sequence To-Sequence Learning", https://pdfs.semanticscholar.org/17de/95a8ec3fe5917d91110b410ab64df33414bf.pdf, Published on: Jun., 2015, 1-13 pages.

Ilievski, et al. "A Focused Dynamic Attention Model for Visual Question Answering", In Journal of the Computing Research Repository, Apr. 2016, pp. 1-15.

Bahdanau, et al. "Neural Machine Translation by Jointly Learning to Align and Translate", In Journal of the Computing Research Repository, Sep. 2014, pp. 1-15.

Yin, et al. "Neural Enquirer: Learning to Query Tables with Natural Language",https://arxiv.org/pdf/1512.00965v2.pdf , Dec. 2015, pp. 1-19.

Kumar, et al., "Ask Me Anything: Dynamic Memory Networks for Natural Language Processing", In Proceedings of the 33rd International Conference on Machine, vol. 48, Jun. 19, 2016, 10 pages.

Merrienboer, et al., "Learning Phrase Representations using RNN Encoder-Decoder for Statistical Machine Translation", In Proceedings of the Conference on Empirical Methods in Natural Language Processing, Oct. 25, 2014, 15 pages.

Luong, et al., "Multi-Task Sequence to Sequence Learning", in Journal of the Computing Research Repository, Nov. 2015, pp. 1-10.

Firat, et al., "Multi-Way, Multilingual Neural Machine Translation with a Shared Attention Mechanism", In Proceedings of the North American Chapter of the Association for Computational Linguistics: Human Language Technologies, Jun. 12, 2016, 10 pages.

Raghuvanshi, et al., "Dynamic Memory Networks for Question Answering", https://cs224d.stanford.edu/reports/RaghuvanshiChase.pdf, Retrieved on: Sep. 30, 2016, 1-9 pages.

Xiong, et al.,"Dynamic Memory Networks for Visual and Textual Question Answering", In Proceedings of the 33rd International Conference on Machine vol. 48 Jun. 19, 2016, 10 pages.

Sutskever, et al. "Sequence to sequence learning with neural networks", In Proceedings of Annual Conference on Neural Information Processing Systems, Dec. 8, 2014, pp. 1-9.

Huang, et al. "Learning Deep Structured Semantic Models for Web Search using Clickthrough Data", In Proceedings of the 22nd ACM international conference on Information & Knowledge Management, Oct. 27, 2013, pp. 2333-2338.

Luong, et al. "Effective Approaches to Attention-based Neural Machine Translation", In Proceedings of the 2015 Conference on Empirical Methods in Natural Language Processing, Sep. 17, 2015, pp. 1412-1421.

Socher, et al. "Reasoning with Neural Tensor Networks for Knowledge Base Completion", In Proceedings of 27th Annual Conference on Neural Information Processing Systems, Dec. 5, 2013, pp. 1-10.

Chorowski, et al., "Towards Better Decoding and Language Model Integration in Sequence to Sequence Models", Retrieved from <<https://arxiv.org/abs/1612.02695>>, Dec. 8, 2016, 6 Pages.

"International Search Report and Written Opinion Issued in PCT Application No. PCT/US2017/065210", dated Mar. 16, 2018, 13 Pages.

Vinyals, et al., "Order Matters: Sequence to Sequence for Sets", Retrieved from <<https://arxiv.org/abs/1511.06391>>, Feb. 23, 2016, 11 Pages.

* cited by examiner

DYNAMIC TENSOR ATTENTION FOR INFORMATION RETRIEVAL SCORING

BACKGROUND

Understanding and processing information contained in natural language queries expressing user intent is a major challenge in document selection. User queries in the form of natural language are usually fuzzy and implicit, which makes it hard to be processed by existing information retrieval systems, often requiring multiple user interaction for further clarification. Furthermore, in order to return a document in response to a query, the query and the proposed document need to be scored, with the best scored proposed document being provided to the user who entered the query. Previous deep learning based scoring methods, such as Convolutional Deep Structured Semantic Models ("CDSSM"), allow scoring query-document pairs relatively effectively, but the scores are distance/similarity based. Similarity is based on the distance between two entities. Similarity is inversely proportional to distance. However, distance/similarity based scoring provides for limited information regarding the appropriateness of a particular document being returned for a given query. So, using distance based scoring, a scoring system may return documents that have the best score, but not necessarily documents that provide meaningful responses to a query.

SUMMARY

Non-limiting examples of the present disclosure describe a method for scoring a query against a document. The method comprises: receiving a query comprising a plurality of words from a user; performing a search for a document comprising words based on the query; feeding the words of the document as the input of an encoder of a multilayer sequence to sequence converter; generating a plurality of vectors at a decoder of the multilayer sequence to sequence converter, each vector comprising a probability associated with a respective word in the query; looking up in the respective vector each word's probability of being associated with the document; multiplying every word's probability together to determine an overall probability of the query being associated with the document; and returning the document to the user if the overall probability of the query being associated with the document is greater than a threshold value.

Further non-limiting examples of the present disclosure describe a system of scoring a query against a document. The system includes at least one processor; and a memory operatively connected with the at least one processor storing computer-executable instructions that, when executed by the at least one processor, causes the at least one processor to execute a method that includes: receiving a query comprising a plurality of words from a user; performing a search for a document comprising words based on the query; feeding the words of the document as the input of an encoder of a multilayer sequence to sequence converter; using an attention mechanism to generate a plurality of vectors at a decoder of the multilayer sequence to sequence converter, each vector comprising a probability associated with a respective word in the query; looking up in the respective vector each word's probability of being associated with the document; multiplying every word's probability together to determine an overall probability of the query being associated with the document; and returning the document to the user if the overall probability of the query being associated with the document is greater than a threshold value.

An additional non-limiting example includes computer storage media storing computer executable instructions for causing the machine to perform the operations of: receiving a query from a user; performing a search on the query; receiving documents that result from the search; scoring the documents using a sequence to sequence converter and an attention network to determine a probability that the query is related to the document; and returning the document if the probability is greater than a threshold value.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
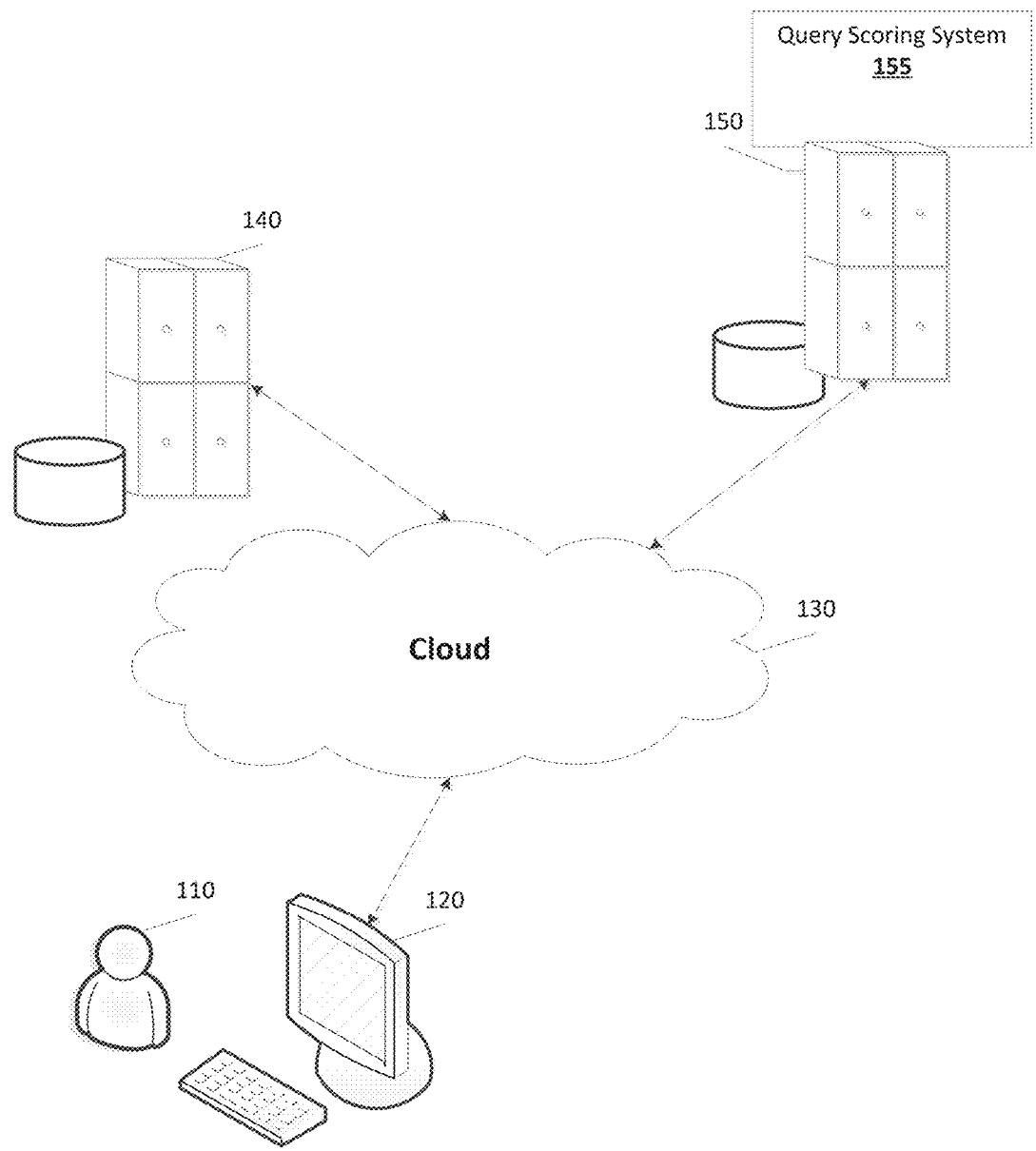
FIG. 1 illustrates a system diagram of the query scoring system in which aspects of the disclosure may be practiced.

FIG. 1 illustrates a system diagram of the query scoring system in which aspects of the disclosure may be practiced. A user 110, using a computer or terminal 120, performs a search command. The computer 120 can be a variety of machines, including machines running the WINDOWS operating system, MacOS operating system, UNIX operating system, or represent a computing device in the cloud. The search is performed by a search server 140 in the cloud. Results from the search server 140 are scored by the scoring server 150 running a query scoring system 155, with the top scored results being returned to the user 110 at computer or terminal 120. The scoring server uses a versatile sequence-to-sequence ("seq2seq") model consisting of a deep Long Short Term Memory ("LSTM") augmented with an attention network to generate probabilistic scores and determine appropriate documents to return. A seq2seq model includes two recurrent neural networks that comprise an encoder that processes input and a decoder that generates output. The basic architecture of a sequence to sequence model is described with respect to FIG. 2 below. An LSTM is a special kind of neural network that is capable of learning long-term dependencies. They are exceptional at remembering information for a long period of time, and comprise multiple layers. An example of an LSTM seq2seq model is given with respect to FIG. 3 below. An attention network focuses the seq2seq model to identify important/entity-like words in a query to facilitate scoring. An attention network is described in more detail with respect to FIG. 6.

The use of a sequence-to-sequence model consisting of a deep Long Short Term Memory augmented with an attention network to generate probabilistic scores significantly enhances computer technology by providing probabilistic interpretation of results, which is a desirable property in information retrieval systems to interpret and improve ranking. Furthermore, probabilistic results allow an information retrieval system to determine whether any resulting documents have a good probability of meeting the user's search request. For example, only documents having over a threshold level of probability may be returned to the user. If no documents have over a threshold level of probability, the user may be prompted to enter more specific search criteria. This is in contrast to the prior art systems that return results based on distance, so that even weak, improbable results would still be returned to the user.

Returning to our description of FIG. 1, those documents that have a probabilistic score greater than a threshold amount are returned to the user. Documents may include any electronic record that provides information, including, but not limited to, web pages, text, word processing files, spreadsheet files, graphics, images, and targeted content. The scoring server 150 is illustrative of one or more computing devices operative to perform scoring operations on search results. The hardware of these computing devices is discussed in greater detail in regard to FIGS. 7 and 8.

Figure 2:
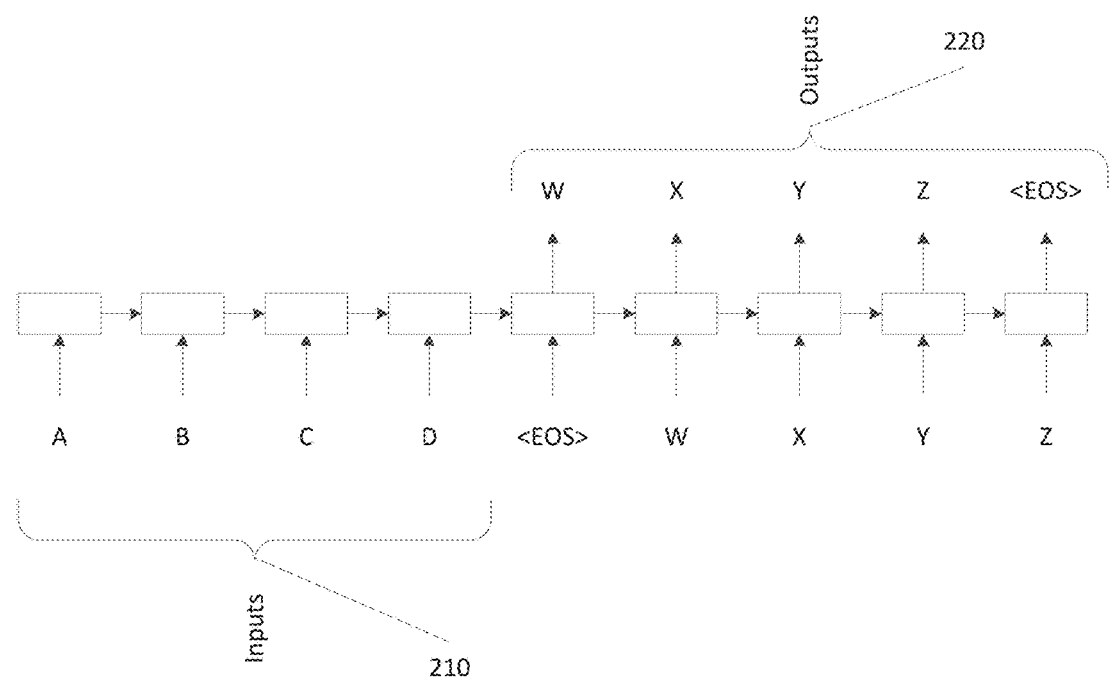
FIG. 2 illustrates a seq2seq process for scoring queries against documents in which aspects of the disclosure may be practices.

FIG. 2 illustrates a seq2seq process for scoring queries against documents in which aspects of the disclosure may be practiced. An LSTM network compares a document to a search query. The search query is sent to a standard information retrieval system to generate results of the query. The seq2seq model has two parts: an encoder 210 that receives inputs; and a decoder 220 that generates output. The encoder 210 embeds a source string of a document, e.g., A, B, C, D, into hidden vectors by leveraging LSTM to transform each word, embedding the words into hidden states. This example shows only a single layer LSTM. Here, each word is encoded and fed into the encoding of the next word. For example, A is encoded and feeds into the encoder of B, which receives both encoded A and B. Encoded A and B are fed into the encoder of C, which receives both encoded A and B along with C. Encoded A, B, C is fed into the encoder of D, which receives both encoded A, B, and C along with D. The resultant hidden vector is fed into the decoder 220.

Next, the decoder 220, shown under outputs W, X, Y, and Z, takes the hidden vectors from the encoder 210 and end of string ("<EOS>") word as inputs and projects a probabilistic score of dictionary size |V|. W, X, Y, and Z are the words of the query entered by the user. The probabilistic score of every word in dictionary size |V|, having no upper bound, but perhaps with a size as large as 1,000,000 words, is projected at each stage of the decoder 220, and each word, W, X, Y, and Z, is looked up in the associated vector and the probability of that word being associated with the hidden vector in the encoder is established. Afterwards, it takes the given word as the input to generate the next vector and repeats. Then, it finishes when an <EOS> is found. After completion, the product of the all of the probabilities multiplied together is the probability that the query is related to the document.

For example, A, B, C, D may be "hdmi," "vga," "cable," "adapter," respectively where a document is "hdmi vga cable adapter." These words would serve as the inputs to the encoder 210. When these words are received by the encoder 210 they are embedded into hidden vectors. For example, the hidden vector that results from "hdmi" being input is fed into the next column of the encoder along with the word "vga." "vga" is then encoded along with "hdmi" into a hidden vector that is fed into the next column of the encoder, along with the word "cable." This process continues until a hidden vector comes out of the last block of the encoder, where that hidden vector contains the encoding of the complete phrase "hdmi vga cable adapter."

The decoder 220 takes the hidden vector with "hdmi vga cable adapter" along with the end of string, <EOS>, input and projects a probabilistic score for every word in a dictionary of dictionary size |V|. In our example, if W, X, Y, Z is "connect," "vga," computer," and "tv," respectively, the system would take the projected output of the first stage of the decoder and look up W or "connect" in the projection of dictionary size |V| and find the probability that "connect" is related to the phrase "hdmi vga cable adapter." That probability, say 0.3, is then associated with "connect"'s relationship to the input phrase "hdmi vga cable adapter." In the next stage of decoder 220, the W word, "connect," is fed into the stage along with the hidden vector that emerges from the first stage, and a projection of dictionary size |V| is generated by the second stage. Then, the X word, "vga," is looked up in the projection, say yielding a value of 0.5, and represents "computer"'s relationship to the phrase "hdmi vga cable adapter." This continues throughout the decoder and all the product of all the probabilities yielded represents that probability that WXYZ or "connect vga computer tv" is related to ABCD or "hdmi vga cable adapter." This probabilistic score is then compared to a threshold value, say 0.04, and if greater than the threshold value the document is presented to the user.

In more detail, the deep seq2seq neural network will use probabilistic scores generated by the network to choose the most effective document to provide to the user. The query scoring system identifies both within query and within document word relationships and interquery document word relationships to score and find relevant documents given a query. The query scoring system uses a seq2seq neural network that uses a Long-Short Term Memory network plus an attention network for understanding queries and scoring documents in natural language form. The attention network is applied to identify important/entity-like words in a query to facilitate scoring. The attention network may be a dynamic tensor network, for example.

Terms from the potential document are fed into the encoder and the possible queries are arrived at in a probabilistic fashion by the decoder. In the encoder, each term is embedded into hidden vectors using multiple layers of LSTM. The decoder takes the hidden vectors and an end-of-string word as inputs and projects probabilistic scores of dictionary size |V|. The query scoring system looks up the probabilistic score of the query word of interest. Afterwards, it takes the current query word as an input to create the probabilistic scores for the next query word, and repeats in this fashion until the query scoring system gets to an end of string, <EOS>, again.

In the decoder each word is generated via a probabilistic projection layer. A probabilistic projection layer is one where there is a probability vector of dictionary size |V| giving probabilities that a given word is associated with a document. Because of the use of a probabilistic projection network, the query scoring system can be used to score a <query, document> pair via the following equation, where m is the number of words in the query: P(Query|Document)= $P(q_1|Document) \ldots P(q_m|q^{m-1}, Document)$.

In other words, the probability that a query is related to a document is the product of the probability that the first word of the query is related to the document multiplied by the probability that the next word is related to the document, given the previous word and the document, and so on until the probability of the last word in the query being related to the document given the document and the word immediately prior to the last word is included in the calculation. This product of the probabilities gives the overall probability that the query is related to the document.

In summary, the query scoring system first feeds text from or describing a document into the encoder. Then, it follows the chain rule of seq2seq converter to find the likelihood of a query given the document via the decoder. Specifically, it identifies the likelihood of each query word in the projection layer of the decoder. Finally, it multiplies the word likelihoods together as the resulting likelihood or probability that the query is related to the document.

An attention network or attention mechanism may be added on top of the seq2seq model to understand the relationship between entity words in queries and documents. Attention mechanisms focus the seq2seq converter. Previous attention mechanisms include direct dot product, multiplying matrices, and using a neural tensor network, but the query scoring system disclosed uses an advanced dynamic tensor network which has not previously been used in a query scoring system. A tensor is a generalized matrix of more than two dimensions that can be encoded in an array. The advanced dynamic tensor mechanism in the attention layer identifies important entity-like words to facilitate scoring. It weight averages source hidden vectors, $h_s$, by their similarity, $\alpha_t$, against a hidden vector, $h_t$, in the decoder. Then, the weight averaged vector, $c_t$, is concatenated against decoding hidden vector, $h_t$, and fed into the projection layer. This attention mechanism not only improves the model, but also identifies important entity-like words via the similarity weight.

The query scoring system may be trained by using a query-document click log, and through this training the probabilistic scores generated by the query scoring system can effectively identify relevant documents for a query.

In one particular example, document click logs of over 500,000 query-document pairs, a comparison was made between general scoring, scoring using a neural tensor network, and scoring using a dynamic tensor network over a seq2seq model for scoring. The dynamic tensor network showed much better, i.e., lower cost, results, where cost is defined as the cross-entropy between the projected likelihoods on dictionary space versus the to-be-decoded ground truth word, which is further summed across all sequences. Thus, using likelihoods yields better results at lower cost.

Figure 3:
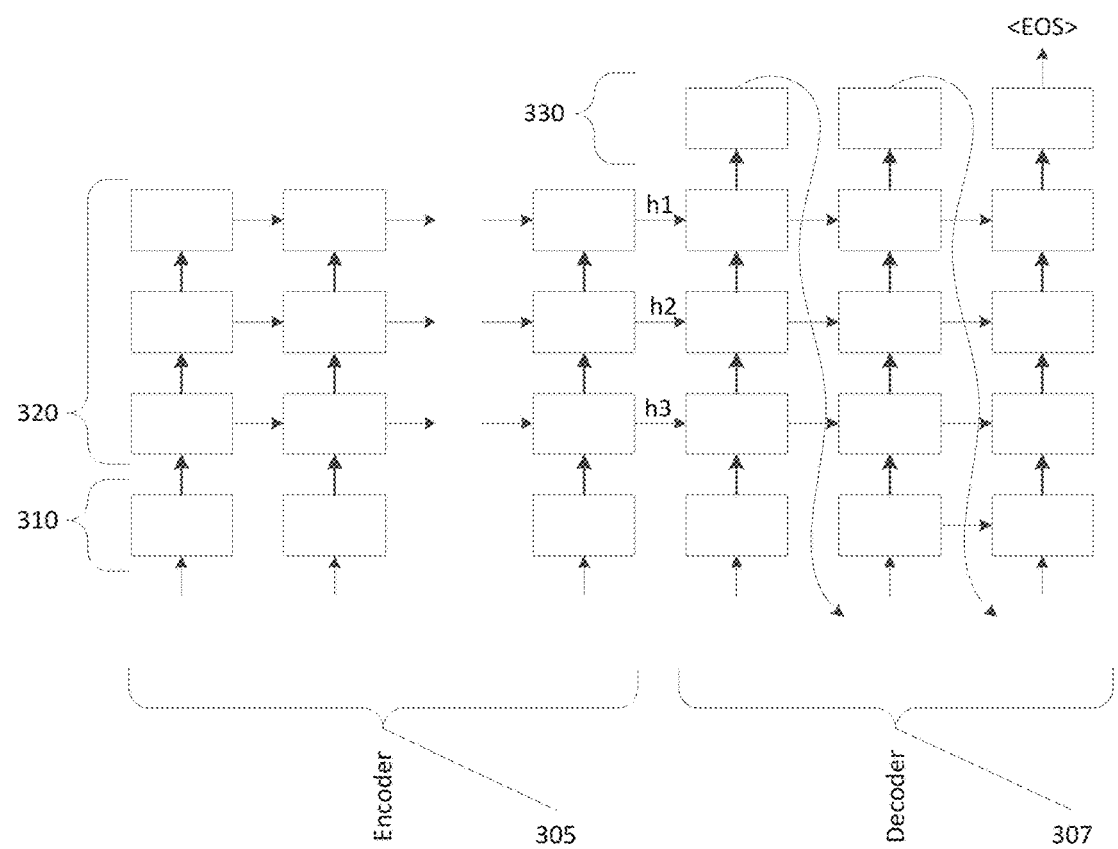
FIG. 3 illustrates a process for scoring queries through the use of a multi-level seq2seq process in which aspects of the disclosure may be practiced.

FIG. 3 illustrates a process for scoring queries through the use of a multi-level seq2seq process in which aspects of the disclosure may be practiced. In this example, a deep encoder/decoder is illustrated that applies multiple layers, i.e., 3, layers in the illustration, but other numbers of layers are contemplated to be useable. The document that is returned by the search is fed into encoder 305, the query that was entered by the user is used as the lookup words by a decoder 307. For example, the document "6 foot displayport hdmi cable" may be entered word by word into each stage of encoder 305, while the query "connect computer tv" may be used as the lookup words by decoder 307.

Each word in the document is fed into embedding layer 310, embedding the words into hidden states, h1, h2, and h3 through the encoding layers 320. The top layer of the encoding layers 320 is hidden vectors $\bar{h}_s$. The decoder 307 decodes the hidden layers, h1, h2, and h3 into vectors of dictionary size |V| that establish probability of each word in the dictionary being associated with the document, and these vectors are $\bar{h}_v$. For each vector $\bar{h}_v$ that results in projection layer 330, the appropriate query word is looked up in the vector and its probability found. So in our previous example, "connect computer tv" was the query phrase making "connect," "computer," and "tv" as the lookup words. Decoder 307 has three stages and "connect" would be the lookup word for stage one; "computer" would be the lookup word for stage two, and "tv" would be the lookup word for stage three. Thus, three vector of dictionary size |V|, consisting of perhaps 100,000 words, would exist at the projection layer 330 for each respective stage, and "connect" would be looked up in the first vector, "computer" in the second vector, and "tv" in the third vector. The results of the lookups are probabilities that each word in the query is associated with the document.

Each query word is fed into the input for determining the vector $\bar{h}_s$. of the next query word. This continues until an end of string, <EOS>, is found at the end of the query. The overall probability of a query given an offer is:

$$P(Query|Doc)=P(q_1|Doc)P(q_2|q_1,Doc) \ldots P(q_m|q_{m-1},Doc)$$

where Query is the query entered by the user and $q_1$ through $q_m$ are the query terms, Doc is the document retrieved, and m is the total number of words in the query.

These scores are then used in determining which documents to return in response to the query. If the overall probability for any document is over a threshold value, those documents are returned to the user. If the overall probability for all documents does not exceed the threshold value, then no documents may be returned to the user, and the user may be prompted for additional input.

The following example will help illustrate the process.

Figure 4:
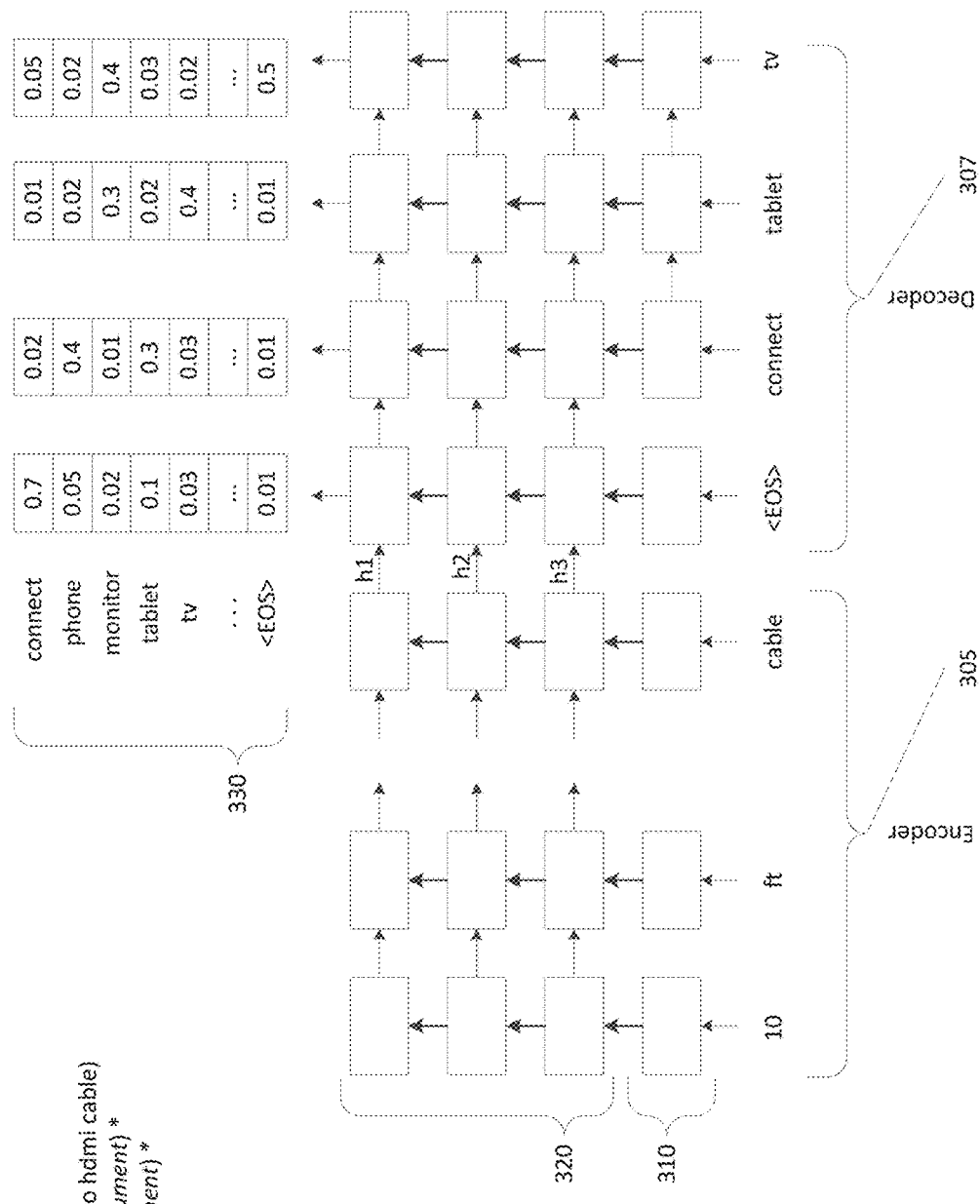
FIG. 4 illustrates a process for scoring queries through the use of a multi-level seq2seq process showing an example in which aspects of the disclosure may be practiced.

FIG. 4 illustrates a process for scoring queries through the use of a multi-level seq2seq process showing an example in which aspects of the disclosure may be practiced. The sample query is "connect tablet tv." The first document returned is "10 ft micro hdmi cable." So "10 ft micro hdmi cable" is fed into encoder 305. Specifically, the phrase is fed into embedding layer 310, with each word, one at a time, being the input to each respective stage of the encoder 305. The encoding layers 320 generate a series of hidden vectors, h1, h2, and h3, which are then fed into decoder 307.

The first stage of decoder 307 takes h1, h2, and h3 as inputs, along with <EOS> which marks the end of string for the document that was retrieved. Its output, vector $\bar{h}_s$ at projection layer 330 contains a vector of dictionary length |V|, which may be as large as 100,000 words for example. Vector $\bar{h}_v$ for the first stage of the decoder contains 100,000 entries, and the entry for the first word of the query," connect," is looked up in the vector to determine its probability of being associated with the document. In this example, the probability for the word "connect" is 0.7. At the next stage, "connect" is fed into the stage along with the outputs of the first stage. This yields a vector $\bar{h}_s$ in which "tablet," the second word of the query, has a probability of 0.3. Please note that "tablet" does not have the highest probability within that vector—that belongs to "phone". However, "tablet" is used as the lookup word because that is the word that is the second word of the query.

This process continues until <EOS> for the search string is reached. The probabilities are then all multiplied together to determine the overall probability that "10 ft micro hdmi cable" is a good result for the search query "connect tablet tv." In this example, $$P(query|document) = P(connect\ tablet\ tv|10\ ft\ micro\ hdmi\ cable) =$$
$$P(connect|\langle EOS \rangle, query|document) *$$
$$P(tablet|connect, query|document) * P(tv|tablet, query|document) *$$
$$P(\langle EOS \rangle|tv, query|document) = 0.7 * 0.3 * 0.4 * 0.5 = .042$$

This query scoring system can be used with documents and queries of any arbitrary length. The query scoring system adjusts the number of stages in the encoder 305 to meet the number of words associated with the document and adjusts the number of stages in the decoder 307 to match the number of words in the query. For a given query, hundreds of documents may be returned by the search engine, so for each document the query scoring system runs an appropriately sized seq2seq converter. For a given query, the number of stages in the decoder 307 will remain the same because the query does not change, but for each document the number of stages in the encoder 305 would vary with the document.

In one sample run of the query scoring system, training was performed on a 3 layer LSTM seq2seq model with the attention layer. The training consisted of approximately 714,000 documents and approximately 299,000 queries. In sum, approximately 4.95 million document-query click pairs were used in the training, and the vocabulary size was set to 30,000 of the most frequently used words. Training took approximately four days on a single GPU. When a search was performed on "connect tablet tv," the five most likely documents were:

10 foot micro hdmi tv cable Lenovo idea tab s6000 10 touch screen tablet pc 10 foot mini hdmi tv cable double power dopo em63 blk android 7 tablet pc 10 foot long micro hdmi tv cable cord nextbook windows 8. tablet <UNK>

Figure 5:
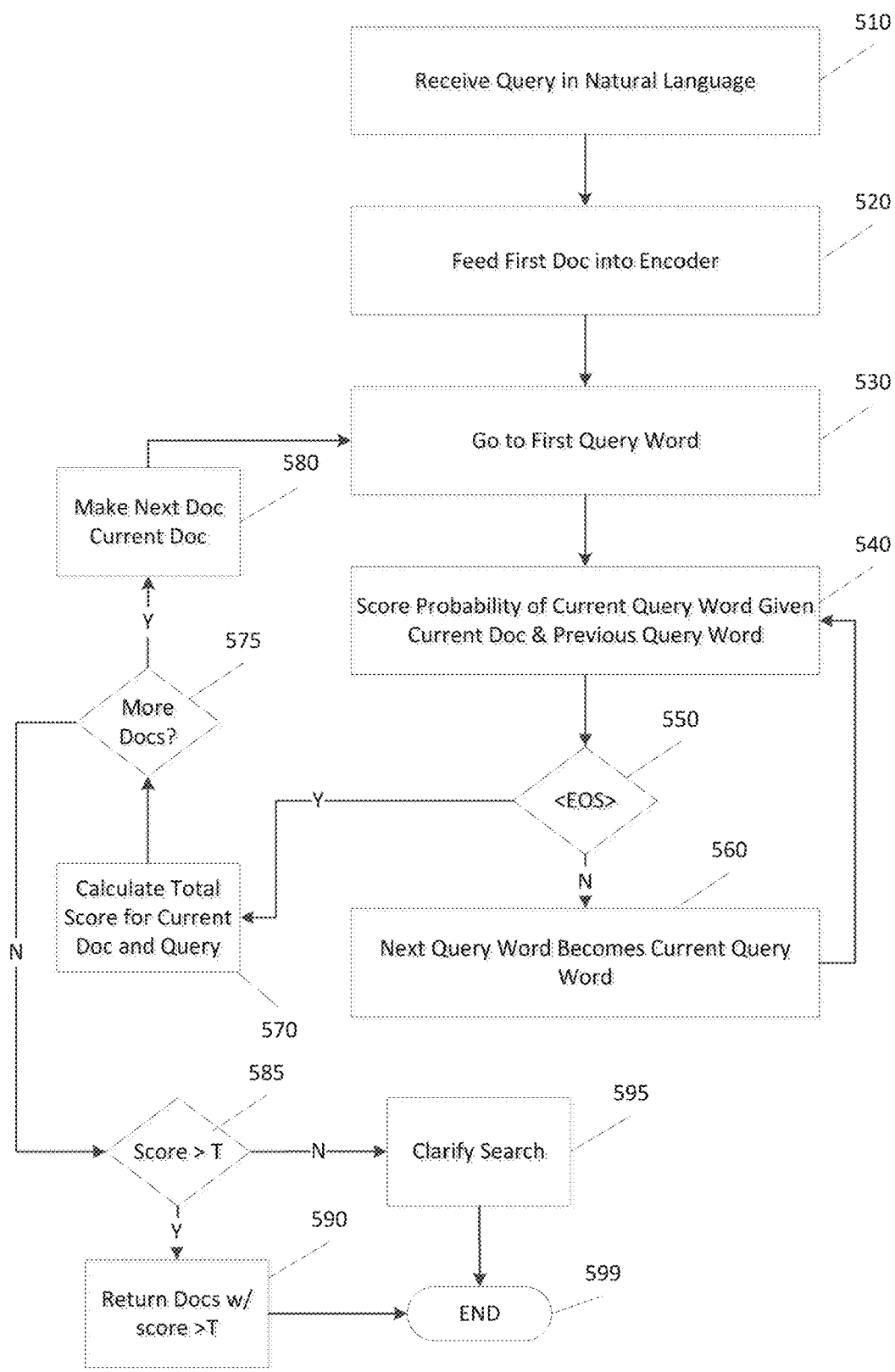
FIG. 5 illustrates a flow chart of the query scoring system in which aspects of the disclosure may be practiced.

10 foot mini hdmi tv cable ematic <UNK> rd hd display android 7 tablet pc 1.5 foot usb power cable amazon fire tv stick micro usb pc FIG. 5 illustrates a flow chart of the query scoring system in which aspects of the disclosure may be practiced. Initially at OPERATION 510 a query is received and a search is performed which retrieves a number of documents. At OPERATION 520 the first document is fed into the embedding layer 310 of the encoder 305. Feeding a document into the encoding layer 310 of the encoder 305 means breaking the document up into a number of words, creating a stage for each word, and feeding each word into respective stages of the encoder 305.

The encoding layers 320 then generate hidden vectors h1, h2, and h3 which are fed into decoder 307. The encoding layers 320 generate hidden vectors h1, h2, and h3 by sequentially taking previous hidden vectors as an input and also inputting the next word from the embedding layer 320. At each stage in the encoder 305, the hidden vector grows as all of the previous information is combined with the new information for the new document word, until the model finally ends up with the hidden vectors h1, h2, and h3.

At OPERATION 530, the first stage of the decoder will generate a vector of dictionary size |V| which projects a vector of probabilities for each word in the dictionary. The size of the dictionary is set by the system, but may be, for example, 100,000 words. At OPERATION 540, the probability is determined for the current word, initially the first word in the query, given the current document returned and the previous query word, initially end of string or <EOS>. Probability is determined by looking up the current word in the projected vector.

At OPERATION 550, a test is made to determine if the current query word is <EOS>. If so, the query words have all been processed, and at OPERATION 570 the total score or probability of the query given the document is calculated. It is calculated as the product of all of the individual probabilities that were extracted from the projection vectors.

If there are still more documents to be scored against the query (OPERATION 575) then the next document is retrieved at OPERATION 580 and is made the current document and the seq2seq converter is run again for the document. If the process query word is not <EOS> (OPERATION 550), in other words if more query words still need to be processed, then at OPERATION 560 the next query word becomes the current query word, the next stage of the decoder 307 is activated, and flow returns to OPERATION 540.

If no more documents are returned by the search, a check is made to see if the scores for any of the documents are greater than a threshold value at OPERATION 585. If so, those documents with a score greater than a threshold value are returned to the user at OPERATION 590 and the query scoring system ends at OPERATION 599. If no documents had a score greater than a threshold value, then a request is made to the user to clarify his search at OPERATION 595. The query scoring system may ask the user a specific question and receive a response from the user, or the query scoring system may simply prompt the user to enter a more specific search. After this request is made, the new query is received at OPERATION 510.

Figure 6:
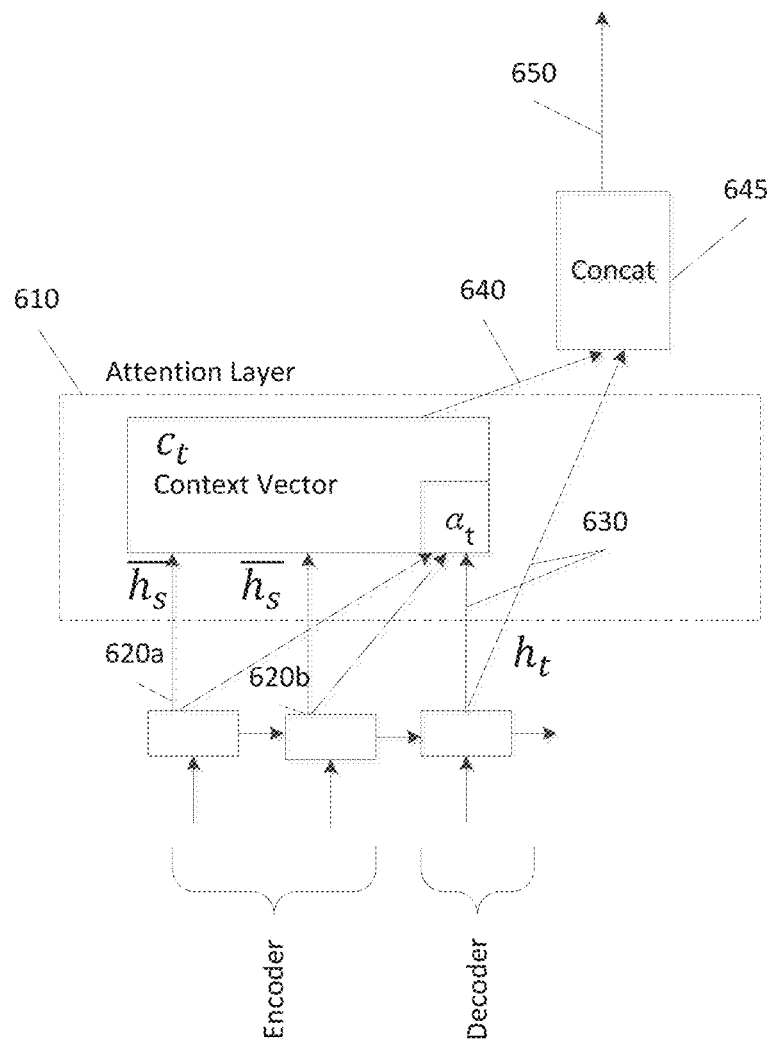
FIG. 6 illustrates an attention layer to identify important words in a query to facilitate scoring in which aspects of the disclosure may be practiced.

FIG. 6 illustrates an attention layer to identify important words in a query to facilitate scoring in which aspects of the disclosure may be practiced. The attention layer 610 is applied to identify important/entity-like words in a query to facilitate scoring. The attention layer 610 aggregates the source query hidden vectors, $\bar{h}_s$, 620a-b by their similarity against a hidden vector in decoder, $h_t$ 630. The aggregation function can be considered as a function f that takes all source query hidden vectors 620a-b and the hidden vector 630 in decoder as inputs, as well as the variable-length alignment weight vector, $\alpha_t$, such that $c_t=f(h_{s1}, \ldots, h_{sm}, \alpha_t, h_t)$. Then, the resulting vector, $c_t$, 640 is concatenated at concatenation 645 against decoding hidden vector $h_t$ and fed into the projection layer as $\tilde{h}_t$ 650. This attention mechanism improves, not only model effectiveness, but also identifies important/entity-like words via the similarity between source document words and the decoded query.

More specifically, at each time step t in decoder stage, a score model is used to infer a variable-length alignment weight vector $a_t$ based on the current target state $h_t$ and all source states $\bar{h}_s$. A global context vector $c_t$ is then computed as the weighted average, according to $a_t$, over all the source states.

Here, score is referred to as a content-based function for which three different alternatives are possible:

$$\text{score}(h_t, \overline{h_s}) = \begin{cases} h_t^T \overline{h_s} & \text{dot} \\ h_t^T W_a \overline{h_s} & \text{general} \\ U_a^T \tanh(W_a[h_t; \overline{h_s}]) & \text{concat} \end{cases}$$

The scores are therefore converted to global align weights $\alpha_t$ for target word vector $h_t$ and source $\overline{h_s}$ $$a_t(s) = \text{align}(h_t, \overline{h_s}) = \frac{\exp(\text{score}(h_t, \overline{h_s}))}{\sum_{s'} \exp(\text{score}(h_t, \overline{h_{s'}}))}$$

An improvement is the use of a neural tensor network, which was created to understand entity relationships. It follows the same idea of scoring two hidden vectors, but it adds the idea of a tensor, i.e. the W matrix used in the 'general' function. The W matrix is expanded to calculate similarity score in k dimensional space. Then, it uses a universal vector U selector to condense the k-dimensional similarity scores into a scalar.

$$g_R(h_1, h_2) = U^T \tan h(h_1^T W_R^{[1:k]} h_2 + V_R^T([h_1; h_2]) + b_R)$$

The disclosed method used in the query scoring system makes the U dynamic. The k-dimensional selector U may vary by the meaning of the source sequence. $U_s$ depends on the aggregated version of source sequence hidden vectors. For LSTM implementation, the last hidden vector should contain the aggregated meaning of the whole source sequence well.

$$\text{score}(h_t, \overline{h_s}) = U_s^T \tan h(h_1^T W_R^{[1:k]} h_2 + v_R^T \tan h(W_a[h_1; h_2]) + b)$$

$$U_s = \overline{h_s}^{\text{agg}} W_s$$

Figure 7:
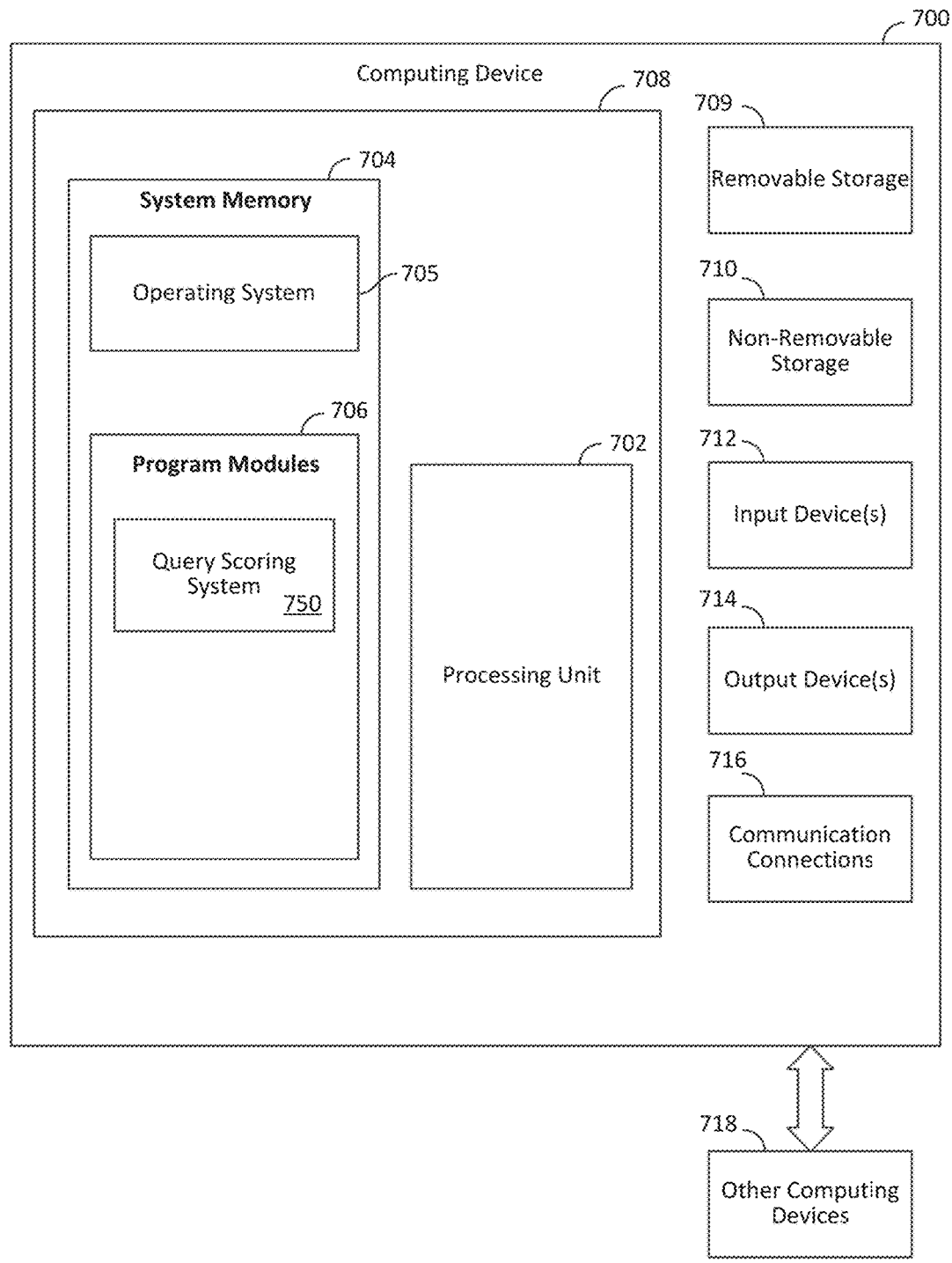
FIG. 7 is a block diagram illustrating example physical components of a computing device with which aspects of the disclosure may be practiced.

FIGS. 7-8 and the associated descriptions provide a discussion of a variety of operating environments in which aspects of the disclosure may be practiced. However, the devices and systems illustrated and discussed with respect to FIGS. 7-8 are for purposes of example and illustration and are not limiting of a vast number of computing device configurations that may be utilized for practicing aspects of the disclosure, as described herein.

FIG. 7 is a block diagram illustrating physical components (e.g., hardware) of a computing device 700 with which aspects of the disclosure may be practiced. The computing device components described below may have computer executable instructions for implementing a query scoring system 750 on a computing device, including computer executable instructions that can be executed to implement the methods disclosed herein. In a basic configuration, the computing device 700 may include at least one processing unit 602 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running query scoring system 750.

The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 600 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., query scoring system 750) may perform processes including, but not limited to, the aspects, as described herein. Other program modules that may be used in accordance with aspects of the present disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
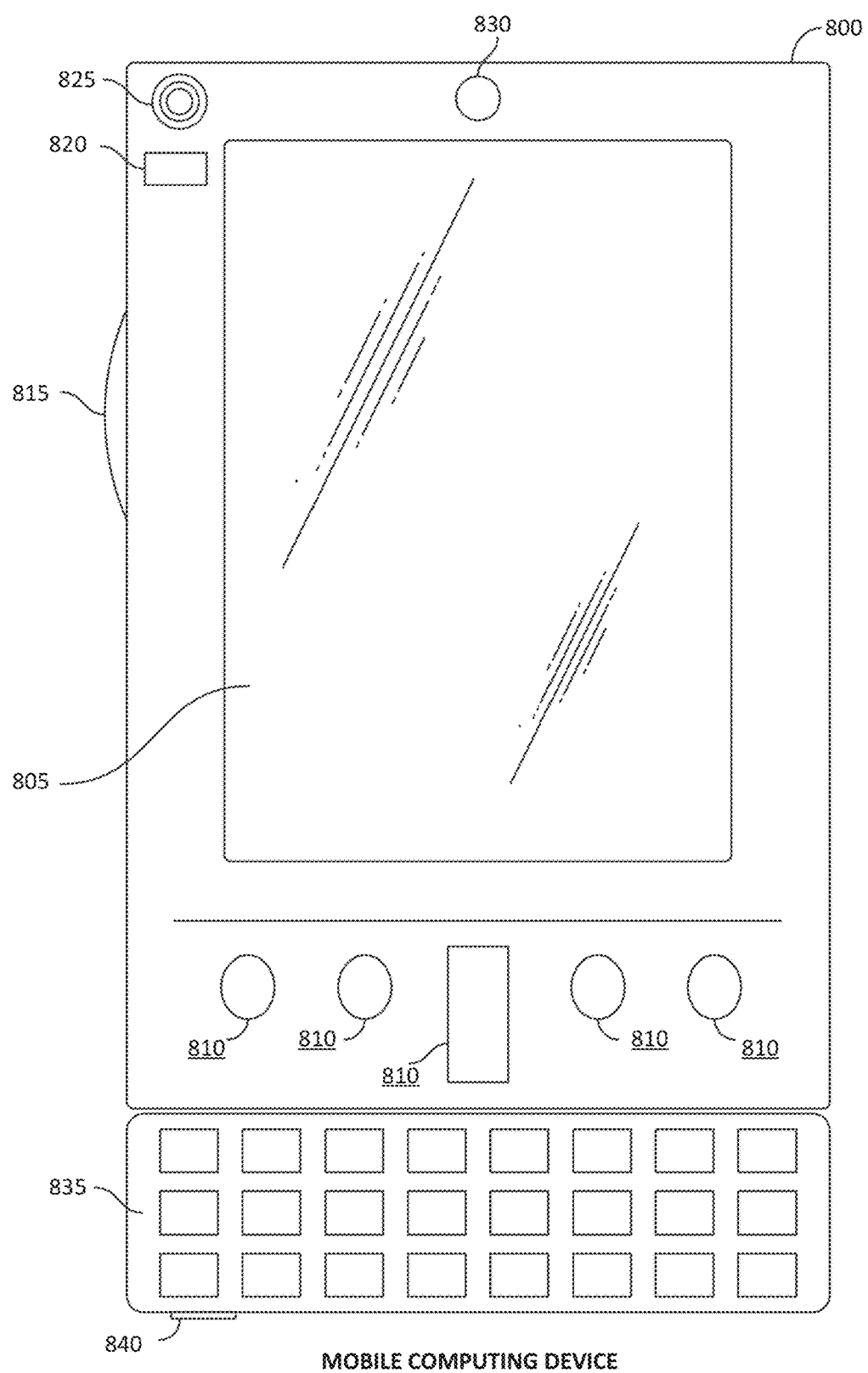
FIGS. 8A and 8B are simplified block diagrams of a mobile computing device with which aspects of the present disclosure may be practiced.
Figure 8B:
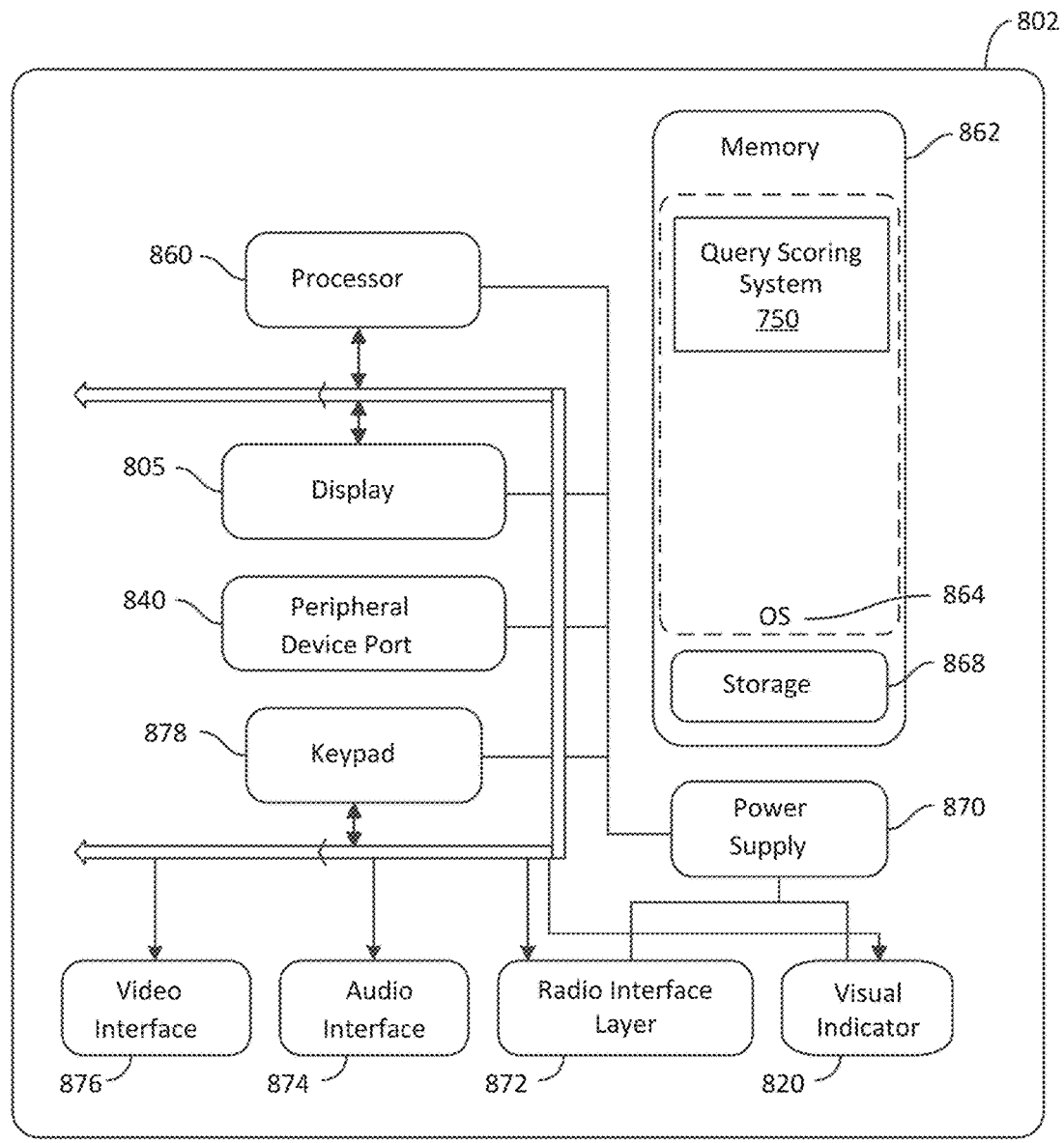

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions for providing a queue analysis application.

The system 802 has a power supply 870, which may be implemented as one or more batteries. The power supply 870 may further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 825 (e.g., audio transducer 825 illustrated in FIG. 8A). In the illustrated embodiment, the visual indicator 820 is a light emitting diode (LED) and the audio transducer 825 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of peripheral device 830 (e.g., on-board camera) to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

As should be appreciated, FIGS. 8A and 8B are described for purposes of illustrating the present methods and systems and are not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
    receiving a query comprising a plurality of words from a user;
    performing a search for a document comprising words based on the query;
    feeding the words of the document as the input of an encoder of a multilayer sequence to sequence converter;
    generating a plurality of vectors at a decoder of the multilayer sequence to sequence converter, each vector of the plurality of vectors being associated with a respective word of the plurality of words in the query;
    for each word of the plurality of words in the query, determining from the vector of the plurality of vectors associated with the respective word, a probability of being associated with the document;
    multiplying probabilities of being associated with the document for two or more words together to determine an overall probability of the query being associated with the document; and
    returning the document to the user if the overall probability of the query being associated with the document is greater than a threshold value.

2. The method of claim 1, further comprising requesting further search information from the user if the overall probability of the query being associated with the document is less than the threshold value.

3. The method of claim 1, wherein the multilayer sequence to sequence converter comprises a three layer sequence to sequence converter.

4. The method of claim 3, further comprising, after feeding the words of the document as the input of an encoder of a multilayer sequence to sequence converter, encoding the words of the document into three hidden vectors h1, h2, and h3.

5. The method of claim 4, wherein generating a plurality of vectors at a decoder further comprises, using the three hidden vectors h1, h2, and h3, along with a previous word in the query to generate the plurality of vectors.

6. The method of claim 5, further comprising using an attention mechanism to generate the probabilities within the plurality of vectors.

7. The method of claim 6, wherein the attention mechanism is a dynamic tensor network.

8. A system comprising:
    at least one processor; and
    a memory operatively connected with the at least one processor storing computer-executable instructions that, when executed by the at least one processor, causes the at least one processor to execute a method that comprises:
    receiving a query comprising a plurality of words from a user;
    performing a search for a document comprising words based on the query;
    feeding the words of the document as the input of an encoder of a multilayer sequence to sequence converter;
    using an attention mechanism to generate a plurality of vectors at a decoder of the multilayer sequence to sequence converter, each vector of the plurality of vectors being associated with a respective word of the plurality of words in the query;
    for each word of the plurality of words in the query, determining from the vector of the plurality of vectors associated with the respective words, a probability of being associated with the document, wherein for at least one word in the query, the probability that the at least one word in the query is related to the document is based on a probability that another word in the query is related to the document;

multiplying probabilities of being associated with the document for each word in the query, together to determine an overall probability of the query being associated with the document; and returning the document to the user if the overall probability is greater than a threshold amount.

9. The system of claim 8, wherein the method further comprises requesting further search information from the user if the overall probability of the query being associated with the document is less than the threshold value.

10. The system of claim 8, wherein the multilayer sequence to sequence converter comprises a three layer sequence to sequence converter.

11. The system of claim 10, wherein the method further comprises, after feeding the words of the document as the input of an encoder of a multilayer sequence to sequence converter, encoding the words of the document into three hidden vectors h1, h2, and h3.

12. The system of claim 11, wherein generating a plurality of vectors at a decoder further comprises, using the three hidden vectors h1, h2, and h3, along with a previous word in the query to generate the plurality of vectors.

13. The system of claim 8, wherein the attention mechanism is a dynamic tensor network.

14. A computer storage media storing computer executable instructions, which, when executed by the computer, cause the computer to perform a method, the method comprising:

receiving a query from a user, the query including a plurality of words;

performing a search on the query;

receiving documents that result from the search;

scoring the documents using a sequence to sequence converter and an attention network to determine a probability that the query is related to the document, wherein the probability that the query is related to the document is based on a probability that a first word of the query is related to the document and a probability that a second word of the query is related to the document, given the first word and the document; and returning the document if the probability is greater than a threshold value.

15. The computer storage media of claim 14, wherein scoring the documents further comprises inputting the query into an encoder of the sequence to sequence converter.

16. The computer storage media of claim 15, wherein the sequence to sequence converter has a three layer encoder.

17. The computer storage media of claim 16, wherein scoring the documents further comprises generating three hidden vectors, h1, h2, and h3, as outputs of the encoder.

18. The computer storage media of claim 17, wherein a decoder in the sequence to sequence converter receives h1, h2, and h3 as inputs.

19. The computer storage media of claim 14, wherein scoring further comprises determining respective probabilities that each word in the query is associated with the document.

20. The computer storage media of claim 19, wherein the probability is calculated as the product of each of the probability for each word multiplied together.

* * * * *